(12) United States Patent
Kim et al.

(10) Patent No.: US 7,417,940 B2
(45) Date of Patent: Aug. 26, 2008

(54) APPARATUS FOR AND METHOD OF CONTROLLING PHOTO DIODE USING DIGITAL POTENTIOMETER

(75) Inventors: Hong-kuk Kim, Seoul (KR); Chul-ho Jeon, Suwon-si (KR); Myoung-cher Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 634 days.

(21) Appl. No.: 10/909,302

(22) Filed: Aug. 3, 2004

(65) Prior Publication Data

US 2005/0163019 A1 Jul. 28, 2005

(30) Foreign Application Priority Data

Jan. 28, 2004 (KR) ...................... 10-2004-0005312

(51) Int. Cl.
*G11B 7/00* (2006.01)
(52) U.S. Cl. ..................... 369/116; 369/53.27
(58) Field of Classification Search ........................ None
See application file for complete search history.

(56) References Cited

U.S. PATENT DOCUMENTS

| | | | | |
|---|---|---|---|---|
| 4,584,687 A | | 4/1986 | Howard ........................ 372/29 |
| 5,119,360 A | * | 6/1992 | Minakuchi .................. 369/116 |
| 5,477,557 A | * | 12/1995 | Inaba et al. ............... 372/38.02 |
| 5,515,350 A | * | 5/1996 | Katayama ................. 369/53.26 |
| 5,751,601 A | * | 5/1998 | Tang et al. .................... 702/104 |
| 6,490,047 B2 | * | 12/2002 | Siu ............................ 356/502 |
| 6,711,189 B1 | * | 3/2004 | Gilliland et al. .......... 372/38.02 |

FOREIGN PATENT DOCUMENTS

| | | |
|---|---|---|
| CN | 1419722 | 5/2003 |
| JP | 60-124981 | 7/1985 |
| JP | 62-114129 | 5/1987 |
| JP | 02-265033 | 10/1990 |
| JP | 03-142725 | 6/1991 |
| JP | 4-143927 | 5/1992 |
| JP | 7-326064 | 12/1995 |
| KR | 2000-69491 | 11/2000 |
| KR | 2002-70710 | 9/2002 |
| KR | 2002-96804 | 12/2002 |
| WO | WO 01/57969 | 8/2001 |

* cited by examiner

*Primary Examiner*—Wayne Young
*Assistant Examiner*—Adam R Giesy
(74) *Attorney, Agent, or Firm*—Staas & Halsey LLP

(57) ABSTRACT

An optical pick up, including: a laser diode which outputs a light in response to an input current; a photo diode which receives the light and outputs a voltage; a digital potentiometer which adjusts the voltage output by the photo diode according to a voltage adjusting signal; and a controller which outputs the input current, sets a first reference voltage to be outputted by the photo diode according to the light, and outputs the voltage adjusting signal to the digital potentiometer according to a difference between the output voltage and the reference voltage.

20 Claims, 2 Drawing Sheets

APPARATUS FOR AND METHOD OF CONTROLLING PHOTO DIODE USING DIGITAL POTENTIOMETER

CROSS-REFERENCE TO RELATED APPLICATION

This application claims the priority of Korean Patent Application No. 2004-5312, filed on Jan. 28, 2004, in the Korean Intellectual Property Office, the disclosure of which is incorporated herein in its entirety by reference.

BACKGROUND OF THE INVENTION

1. Field of the Invention

The present invention relates to a photo diode of an optical pick-up device, and more particularly, to an apparatus for and method of controlling sensitivity of a photo diode using a digital potentiometer.

2. Description of Related Art

An optical pick-up device is used for reading, writing and deleting data from an optical disk using light emitted from a laser diode (LD). A monitor photo diode (PD), called also a front photo diode (FPD), detects optical power emitted from the laser diode of the optical pick-up device and feeds back a detected result to an optical power controller. The optical power controller controls the optical power of the laser diode with optical power information fed back from the monitor photo diode.

With the development of high performance optical disk drives (ODD), it is more important to control the sensitivity of the photo diode. Easy and exact control of the sensitivity greatly contribute to improvement in performance of ODDs.

A conventional optical pick-up device has a 500-Ohm or 2.2K-Ohm variable resistor, i.e., manual rotary resistor, in order to control the sensitivity of the photo diode. However, because of errors and loss of control time caused by an operator's direct control, it is hard to control the sensitivity of the photodiode with such variable resistors.

BRIEF SUMMARY

The present invention provides an apparatus for and method of controlling a photo diode in which a digital potentiometer is provided instead of a rotary variable resistor to reduce errors and adjusting time.

According to an aspect of the present invention, there is provided an optical pick up, including: a laser diode which outputs a light in response to an input current; a photo diode which receives the light and outputs a voltage; a digital potentiometer which adjusts the voltage output by the photo diode according to a voltage adjusting signal; and a controller which outputs the input current, sets a first reference voltage to be outputted by the photo diode according to the light, and outputs the voltage adjusting signal to the digital potentiometer according to a difference between the output voltage and the reference voltage.

The optical pick up may further include an optical power meter, which measures an optical power of the light and outputs the measured optical power to the controller.

The input current may be a first input current, and the controller may output a second input current to the laser diode and set a second reference voltage corresponding to the second input current to ascertain whether the output voltage of the photo diode is equal to the second reference voltage, thereby confirming the sensitivity adjustment of the photo diode.

According to another aspect of the present invention, there is provided a a method of controlling a sensitivity of a photo diode including a digital potentiometer which adjusts an output voltage of the photo diode, including: setting an output reference voltage of the photo diode according to a light; measuring the output voltage of the photo diode by receiving at least some of the light; and making the output voltage equal to the reference voltage by applying a voltage adjusting signal to the digital potentiometer.

The input current may be a first input current, and the method may further include, after the making the output voltage of the photo diode equal to the reference voltage, outputting a second input current to the laser diode, setting a second reference voltage corresponding to the second input current and ascertaining whether the output voltage of the photo diode is equal to the second reference voltage.

According to another aspect of the present invention, there is provided a method of adjusting a sensitivity of a photo diode having a digital potentiometer, including: emitting a light from a laser diode in response to a current; measuring an optical power of the light; setting a reference voltage according to the measured optical power; detecting at least some of the light via the photo diode and outputting an output voltage via the digital potentiometer in response to the detection; determining whether the output voltage is equal to the reference voltage; and sending, when it is determined that the output voltage is not equal to the reference voltage, a voltage adjusting signal to the digital potentiometer so that the output voltage equals the reference voltage.

According to another aspect of the present invention, there is provided an apparatus for adjusting a sensitivity of a photo diode via a digital potentiometer, including: a laser diode which emits a light in response to a current; an optical power meter which measures an optical power of the light; and a controller which sets a reference voltage according to the measured optical power, determines whether an output voltage output from the photo diode is equal to the reference voltage, and sends, when it is determined that the output voltage is not equal to the reference voltage, a voltage adjusting signal to the digital potentiometer so that the output voltage equals the reference voltage. The photodiode detects at least some of the light and outputs the output voltage via the digital potentiometer in response to the detection.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF EMBODIMENT

Figure 1:
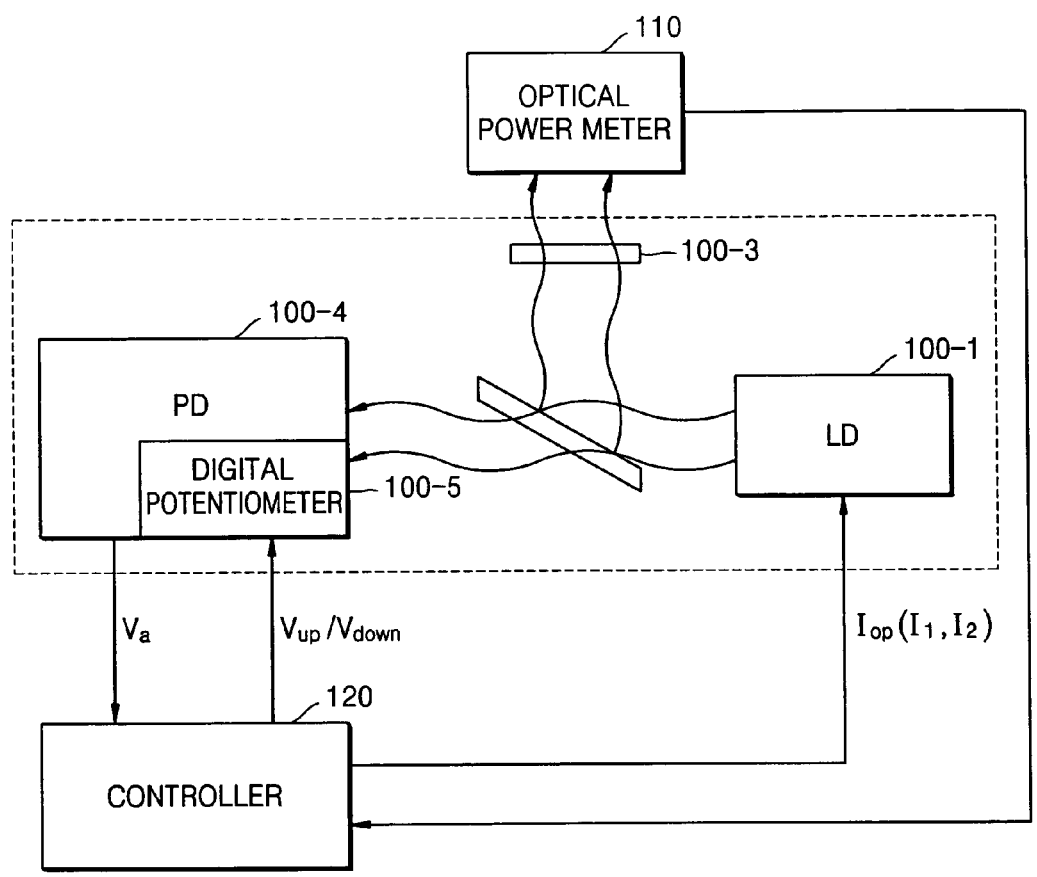
FIG. 1 is a block diagram of an apparatus for controlling a photo diode using a digital potentiometer according to an embodiment of the present invention.

Reference will now be made in detail to the embodiments of the present invention, an example of which are illustrated in the accompanying drawings, wherein like reference numerals refer to the like elements throughout. The embodiments are described below to explain the present invention by referring to the figures.

FIG. 1 is a block diagram of an apparatus for controlling a photo diode using a digital potentiometer according to a first embodiment the present invention. The apparatus includes an optical pick-up device 100, an optical power meter 110 and a controller 120. The optical pick-up device 100 includes a laser diode (LD) 100-1, a splitter 100-2, an object lens (OL) 100-3, a photo diode (PD) 100-4 and a digital potentiometer 100-5.

Figure 2:
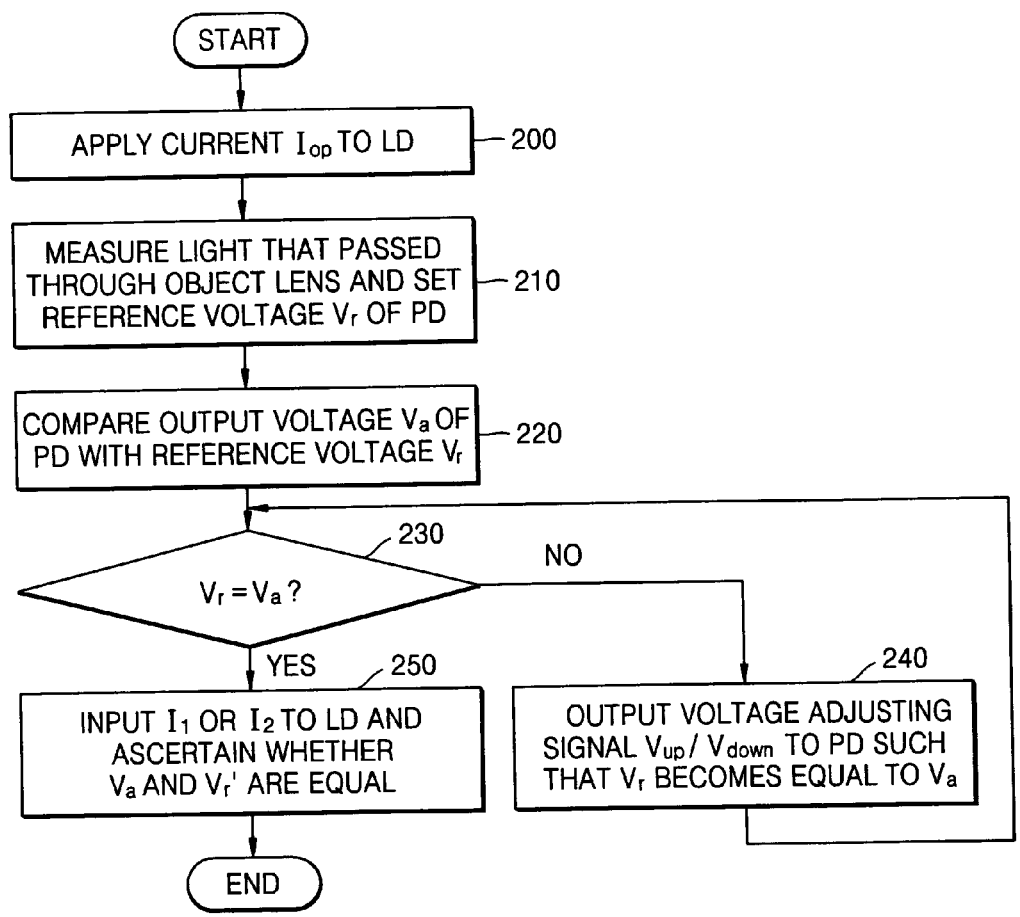
FIG. 2 is a flowchart illustrating a method of controlling a photo diode using a digital potentiometer according to the embodiment of the present invention.

FIG. 2 is a flowchart illustrating a method of controlling the photo diode 100-4 using the digital potentiometer 100-5. The method includes an operation 200 of inputting a current $I_{op}$ ($I_1$) to the laser diode 100-1, an operation 210 of detecting an output light of the object lens 100-3 and setting a reference voltage $V_r$ to be outputted by the photo diode 1004, an operation 220 of comparing an actual output voltage $V_a$ of the photo diode 100-4 with the reference voltage $V_r$, an operation 240 of sending a voltage adjusting signal $V_{up}/V_{down}$ to the photo diode 100-4 such that the reference voltage $V_r$ is equal to the actual output voltage $V_a$, and an operation 250 of inputting a second current $I_{op}(I_2)$ to the laser diode 100-1 and then ascertaining whether the actual output voltage $V_a$ of the photo diode 100-4 is equal to a second reference voltage $V_r$.

The apparatus and method of controlling a photo diode using a digital potentiometer will now be described with continued reference to FIGS. 1 and 2.

First, the apparatus of the present embodiment will now be described with reference to FIG. 1.

The laser diode 100-1 of the optical pick-up device 100 to which is applied a current $I_{op}(I_1)$ emits a light. The light of the laser diode 100-1 passes through the splitter 100-2 and the object lens 100-3, and then reaches the optical power meter 110.

The photo diode 100-4 detects some of the light that has passed through the splitter 100-2, generates an output voltage $V_a$ proportional to the intensity of the detected light and sends the output voltage $V_a$ to the controller 120. The photo diode 100-4 includes the digital potentiometer 100-5 which is capable of changing the output voltage $V_a$, in order to adjust its sensitivity.

The optical power meter 110 measures the optical power of the light that passed the object lens 100-3.

The controller 120 sends the current $I_{op}(I_1)$ to the laser diode 100-1 and then sets the reference voltage $V_r$ of the photo diode 100-4 with respect to the optical power measured from the optical power meter 110. The controller 120 compares the output voltage $V_a$ of the photo diode 100-4 with the reference voltage $V_r$ and sends the voltage adjusting signal $V_{up}/V_{down}$ to the digital potentiometer 100-5 in order to make the output voltage $V_a$ equal to the reference voltage $V_r$.

When the output voltage $V_a$ of the photo diode 100-4 is greater than the reference voltage $V_r$, the controller 120 sends the voltage adjusting signal $V_{down}$ to the digital potentiometer 100-5 in order to decrease the output voltage $V_a$ of the photo diode 1004, and then the digital potentiometer 100-5 decreases the output voltage $V_a$ of the photo diode 100-4 and sends the decreased voltage $V_a$ to the controller 120 again for comparing with the reference voltage $V_r$.

Conversely, when the output voltage $V_a$ of the photo diode 100-4 is smaller than the reference voltage $V_r$, the controller 120 sends the voltage adjusting signal $V_{up}$ to the digital potentiometer 100-5 in order to increase the output voltage $V_a$ of the photo diode 100-4, and then the digital potentiometer 100-5 increases the output voltage $V_a$ of the photo diode 100-4 and sends the increased voltage $V_a$ to the controller 120 again for comparing with the reference voltage $V_r$.

If the output voltage $V_a$ becomes equal to the reference voltage $V_r$, the controller 120 sends another current $I_{op}(I_2)$, which is different from the current $I_{op}(I_1)$, to the laser diode 100-1. The controller 120 accordingly sets another reference voltage $V_r'$ and compares the reference voltage $V_r'$ with another output voltage $V_a$ of the photo diode 100-4. Therefore, with this procedure, the sensitivity of the photo diode 100-4 is more precisely adjusted.

Second, the method of the present embodiment will be described with reference to FIG. 2.

In operation 200, the controller 120 sends the current $I_{op}(I_1)$ to the laser diode 100-1 in order to drive the same.

In operation 210, the laser diode 100-1 receives the current $I_{op}(I_1)$ to emit a light, and the optical power meter 110 measures the optical power of the light received through the object lens 100-3 and send the result to the controller 120, and then the controller sets the reference voltage $V_r$ of the photo diode 100-4 with respect to the measured optical power.

In operations 220 and 230, the controller 120 compares the output voltage $V_a$ with the reference voltage $V_r$ and ascertains whether they are equal or not.

In operation 240, if the output voltage $V_a$ of the photo diode 1004 is different from the reference voltage $V_r$, the controller 120 sends the voltage adjusting signal ($V_{up}/V_{down}$) to the digital potentiometer 100-5 which is provided in the photo diode 100-4.

When the output voltage $V_a$ is larger than the reference voltage $V_r$, the controller 120 sends the voltage adjusting signal $V_{down}$ to the digital potentiometer in order to decrease the output voltage $V_a$. Then the digital potentiometer 100-5 decreases the output voltage $V_a$ of the photo diode 100-4 and thus the output voltage $V_a$ becomes equal to the reference voltage $V_r$. Conversely, when the output voltage $V_a$ of the photo diode 100-4 is smaller than the reference voltage $V_r$, the controller 120 sends the voltage adjusting signal $V_{up}$ to the digital potentiometer 100-5 in order to increase the output voltage $V_a$. Then, the digital potentiometer 100-5 decreases the output voltage $V_a$ of the photo diode 100-4 and thus the output voltage $V_a$ becomes equal to the reference voltage $V_r$.

In operation 250, if the output voltage $V_a$ of the photo diode becomes equal to the reference voltage, the controller 120 sends another current $I_{op}(I_2)$, which is different from the current $I_{op}(I_1)$, to the laser diode 100-1 and then sets another reference voltage $V_r'$ accordingly in order to ascertain whether the reference voltage $V_r'$ and another output voltage $V_a$ of the photo diode 1004 are equal or not.

As described above, the described embodiment of the present invention adopts a digital potentiometer instead of a conventional rotary variable resistor in order to control the sensitivity of a photo diode so that errors and long adjusting time due to the rotary variable resistor are reduced.

Although an embodiment of the present invention has been shown and described, the present invention is not limited to the described embodiment. Instead, it would be appreciated by those skilled in the art that changes may be made in this embodiment without departing from the principles and spirit of the invention, the scope of which is defined by the claims and their equivalents.

What is claimed is:

1. An optical pick up, comprising:
  a laser diode which outputs a light in response to an input current;
  a photo diode which receives the light and outputs a voltage;

a digital potentiometer which adjusts the voltage output by the photo diode according to a voltage adjusting signal, the digital potentiometer being included in the photo diode; and a controller which outputs the input current, sets a first reference voltage to be outputted by the photo diode according to the light, and outputs the voltage adjusting signal to the digital potentiometer according to a difference between the output voltage and the first reference voltage, wherein when the output voltage is equal to the first reference voltage, the input current is a first input current, and the controller outputs a second input current to the laser diode and sets a second reference voltage corresponding to the second input current to ascertain whether another output voltage of the photo diode is equal to the second reference voltage to confirm a sensitivity adjustment of the photo diode.

2. The optical pick up of claim 1, wherein the voltage is usable to adjust the sensitivity of the digital potentiometer.

3. The optical pick up of claim 1, further comprising an optical power meter which measures an optical power of the light and outputs the measured optical power to the controller.

4. The optical pick up of claim 1, further comprising;
a splitter; and
an object lens,
wherein the light measured by the optical power sensor passes through the splitter and the object lens.

5. The optical pick up of claim 1, further including a filter, wherein the photo diode receives at least some of the light after the light passes through the filter.

6. The optical pick up of claim 1, wherein the output voltage is proportional to the intensity of the detected light.

7. The optical pick up of claim 1, further comprising:
an optical pick-up device;
an optical power meter;
an object lens,
wherein the optical pick-up includes the laser diode, a splitter, the object lens, the photo diode, and the digital potentiometer.

8. The optical pick up of claim 1, wherein, when the output voltage is greater than the reference voltage, the voltage adjusting signal indicates a decrease in the output voltage.

9. The optical pick up of claim 1, wherein, when the output voltage is less than the reference voltage, the voltage adjusting signal indicates an increase in the output voltage.

10. An optical pick up, comprising:
a laser diode which outputs a light in response to an input current;
a photo diode which receives the light and outputs a voltage;
a digital potentiometer which adjusts the voltage output by the photo diode according to a voltage adjusting signal; and
a controller which outputs the input current, sets a first reference voltage to be outputted by the photo diode according to the light, and outputs the voltage adjusting signal to the digital potentiometer according to a difference between the output voltage and the reference voltage, wherein, when the output voltage is equal to the reference voltage, the controller:
sends a second current different from the first current to the laser diode causing the laser diode to emit a second light;

sets a second reference voltage; and compares the second reference voltage with a second output voltage, and the photo diode outputs the second voltage in response to the second light.

11. The optical pick up of claim 10, wherein the digital potentiometer is included in the photo diode.

12. A method of controlling a sensitivity of a photo diode including a digital potentiometer which adjusts an output voltage of the photo diode, comprising:
outputting a light in response to an input current;
setting an output reference voltage of the photo diode according to the light;
measuring the output voltage of the photo diode by receiving at least some of the light; and
making the output voltage equal to the reference voltage by applying a voltage adjusting signal to the digital potentiometer, wherein when the output voltage is equal to the output reference voltage, outputting another input current to the laser diode and setting another output reference voltage corresponding to the another input current to ascertain whether the another output voltage of the photo diode is equal to the another reference voltage to confirm a sensitivity adjustment of the photo diode.

13. The method of claim 12, wherein the digital potentiometer is included in the photo diode.

14. The method of claim 12, wherein the light is output by a laser diode in response to the input current.

15. A method of adjusting a sensitivity of a photo diode having a digital potentiometer, comprising:
emitting a light from a laser diode in response to a current;
measuring an optical power of the light;
setting a reference voltage according to the measured optical power;
detecting at least some of the light via the photo diode and outputting an output voltage via the digital potentiometer in response to the detection;
determining whether the output voltage is equal to the reference voltage; and
sending, when it is determined that the output voltage is not equal to the reference voltage, a voltage adjusting signal to the digital potentiometer, so that the output voltage equals the reference voltage, wherein when the output voltage is equal to the reference voltage, emitting another light in response to another current and setting another output reference voltage corresponding to the another current to ascertain whether another output voltage of the photo diode is equal to the another reference voltage to confirm a sensitivity adjustment of the photo diode.

16. The method of claim 15, wherein the digital potentiometer is included in the photo diode.

17. The method of claim 15, wherein the voltage adjusting signal indicates a decrease of the output voltage when the output voltage is greater than the reference voltage so that the digital potentiometer decreases the output voltage.

18. A method of adjusting a sensitivity of a photo diode having a digital potentiometer, comprising:
emitting a light from a laser diode in response to a current;
measuring an optical power of the light;
setting a reference voltage according to the measured optical power;
detecting at least some of the light via the photo diode and outputting an output voltage via the digital potentiometer in response to the detection;

determining whether the output voltage is equal to the reference voltage; and sending, when it is determined that the output voltage is not equal to the reference voltage, a voltage adjusting signal to the digital potentiometer so that the output voltage equals the reference voltage, wherein the light is a first light and the current is a first current, the method further comprises:

sending, when it is determined that the output voltage equals the reference voltage, a second current to the laser diode different from the first current;

emitting a second light from a laser diode in response to the second current;

measuring an optical power of the second light;

setting a second reference voltage according to the measured optical power of the second light;

detecting at least some of the second light and outputting an output voltage via a digital potentiometer in response to the detection; and determining whether the output voltage is equal to the second reference voltage.

19. An apparatus for adjusting a sensitivity of a photo diode via a digital potentiometer, comprising:

a laser diode which emits a light in response to a current;

an optical power meter which measures an optical power of the light; and a controller which sets a reference voltage according to the measured optical power, determines whether an output voltage output from the photo diode is equal to the reference voltage, and sends, when it is determined that the output voltage is not equal to the reference voltage, a voltage adjusting signal to the digital potentiometer so that the output voltage equals the reference voltage, wherein the photodiode detects at least some of the light and outputs the output voltage via the digital potentiometer in response to the detection, and wherein when the output voltage is equal to the reference voltage, the input current is a first input current, and the controller outputs a second input current to the laser diode and sets another reference voltage corresponding to the second input current to ascertain whether another output voltage of the photo diode is equal to the another reference voltage to confirm a sensitivity adjustment of the photo diode.

20. The apparatus of claim 19, wherein the digital potentiometer is part of the photo diode.

* * * * *